(12) United States Patent
Kolar et al.

(10) Patent No.: US 11,409,516 B2
(45) Date of Patent: Aug. 9, 2022

(54) PREDICTING THE IMPACT OF NETWORK SOFTWARE UPGRADES ON MACHINE LEARNING MODEL PERFORMANCE

(71) Applicant: Cisco Technology, Inc., San Jose, CA (US)

(72) Inventors: Vinay Kumar Kolar, San Jose, CA (US); Jean-Philippe Vasseur, Saint Martin D'uriage (FR); Grégory Mermoud, Veyras VS (CH); Pierre-Andre Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/709,307

(22) Filed: Dec. 10, 2019

(65) Prior Publication Data

US 2021/0173636 A1 Jun. 10, 2021

(51) Int. Cl.
*G06F 9/44* (2018.01)
*G06F 8/71* (2018.01)
*H04L 43/00* (2022.01)
*G06N 20/00* (2019.01)

(52) U.S. Cl.
CPC .............. *G06F 8/71* (2013.01); *G06N 20/00* (2019.01); *H04L 43/14* (2013.01)

(58) Field of Classification Search
CPC ............ G06F 8/71; G06N 20/00; H04L 43/14
USPC ........................................................ 717/121
See application file for complete search history.

(56) References Cited

U.S. PATENT DOCUMENTS

| 8,423,963 | B2 | 4/2013 | Garbers et al. | |
|---|---|---|---|---|
| 8,639,365 | B2* | 1/2014 | Pannese | G06F 30/20 |
| | | | | 706/14 |
| 9,400,735 | B2 | 7/2016 | Huang et al. | |
| 9,860,109 | B2 | 1/2018 | Koverman et al. | |
| 10,599,984 | B1* | 3/2020 | Wubbels | G16H 30/40 |
| 2010/0235823 | A1* | 9/2010 | Garbers | G06F 8/71 |
| | | | | 717/170 |
| 2014/0236530 | A1* | 8/2014 | Greene | G01P 15/18 |
| | | | | 702/141 |
| 2016/0099963 | A1* | 4/2016 | Mahaffey | G06F 21/554 |
| | | | | 726/25 |

(Continued)

OTHER PUBLICATIONS

Badnets: Identifying vulnerabilities in the machine learning model supply chain ; author: T Gu etal, published on 2017.*

(Continued)

*Primary Examiner* — Chameli Das
(74) *Attorney, Agent, or Firm* — Behmke Innovation Group LLC; Kenneth J. Heywood; Jonathon P. Western

(57) ABSTRACT

In one embodiment, a service receives software version data regarding versions of software executed by devices in a network. The service detects a version change in the version of software executed by one or more of the devices, based on the received software version data. The service makes a determination that a drop in data quality of input data for a machine learning model used to monitor the network is associated with the detected version change. The service reverts the one or more devices to a prior version of software, based on the determination that the drop in quality of the input data for the machine learning model used to monitor the network is associated with the detected version change.

15 Claims, 10 Drawing Sheets

(56) References Cited

U.S. PATENT DOCUMENTS

| | | | | |
|---|---|---|---|---|
| 2016/0371701 A1* | 12/2016 | Mirza | | G06Q 30/016 |
| 2017/0034023 A1* | 2/2017 | Nickolov | | H04L 43/0817 |
| 2017/0078141 A1* | 3/2017 | Lazarescu | | H04L 43/08 |
| 2017/0091651 A1* | 3/2017 | Miao | | G06N 20/00 |
| 2017/0353991 A1 | 12/2017 | Tapia | | |
| 2019/0050973 A1* | 2/2019 | Bernal | | G06T 5/20 |
| 2019/0207822 A1* | 7/2019 | Di Pietro | | G06N 3/08 |
| 2019/0253328 A1 | 8/2019 | Kolar et al. | | |
| 2019/0377602 A1* | 12/2019 | Mosca | | G06F 9/4887 |
| 2020/0065863 A1* | 2/2020 | Hong | | G06F 16/9535 |
| 2020/0081729 A1* | 3/2020 | Speak | | G06F 9/4451 |
| 2020/0097724 A1* | 3/2020 | Chakravarty | | G06K 9/00664 |
| 2020/0125973 A1* | 4/2020 | Townend | | G06N 20/00 |
| 2020/0136960 A1* | 4/2020 | Jeuk | | H04L 69/22 |
| 2020/0174978 A1* | 6/2020 | Rudek | | G06F 21/6209 |
| 2020/0252324 A1* | 8/2020 | Sanchez Charles | | H04L 45/021 |
| 2020/0314128 A1* | 10/2020 | Hild | | G06N 20/00 |
| 2020/0324407 A1* | 10/2020 | Rajkumar | | B25J 9/163 |
| 2020/0334535 A1* | 10/2020 | Rippel | | G06K 9/6274 |
| 2020/0387836 A1* | 12/2020 | Nasr-Azadani | | G06N 20/20 |
| 2021/0133378 A1* | 5/2021 | Kosic | | G06F 30/27 |
| 2021/0150393 A1* | 5/2021 | Johansson | | H04L 65/80 |
| 2021/0295439 A1* | 9/2021 | Konrardy | | G05D 1/0287 |

OTHER PUBLICATIONS

Dadiannao: A machine-learning supercomputer, author: Y Chen et al., published on 2014.*

An overview on application of machine learning techniques in optical networks, author: F Musumeci et al, published on 2018.*

Title: Progressive neural networks, author: AA Rusu published on 2016.*

Title: Using machine learning to secure IoT systems, author: J Canedo, published on 2016.*

Bachwani, Rekha, "Preventing and Diagnosing Software Upgrade Failures", Semantic Scholar, Jan. 2012, pp. 1-77.

* cited by examiner

PREDICTING THE IMPACT OF NETWORK SOFTWARE UPGRADES ON MACHINE LEARNING MODEL PERFORMANCE

TECHNICAL FIELD

The present disclosure relates generally to computer networks, and, more particularly, to predicting the impact of network software upgrades on machine learning model performance.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

With the recent proliferation of machine learning techniques, new opportunities have arisen with respect to monitoring a network. Indeed, machine learning has proven quite capable of analyzing complex network patterns and identifying problems that might otherwise be missed by a network administrator. In some cases, a machine learning-based network assurance system may even be able to predict problems before they occur, allowing for corrective measures to be taken in advance.

The timeline between software version releases is increasingly shrinking, as developers are embracing approaches such as continuous-integration/continuous-deployment (CI/CD). This means that the software executed in a typical network is constantly evolving. Although such upgrades are often desirable from the standpoints of security, device functionality, etc., software upgrades can also impinge on the performance of any machine learning models trained to monitor the network. Notably, a software change on any given device may change the behavior of the device and/or affect the data used as input to the model, leading to a reduction in the performance of the model.

DESCRIPTION OF EXAMPLE EMBODIMENTS

Overview

Figure 1A:
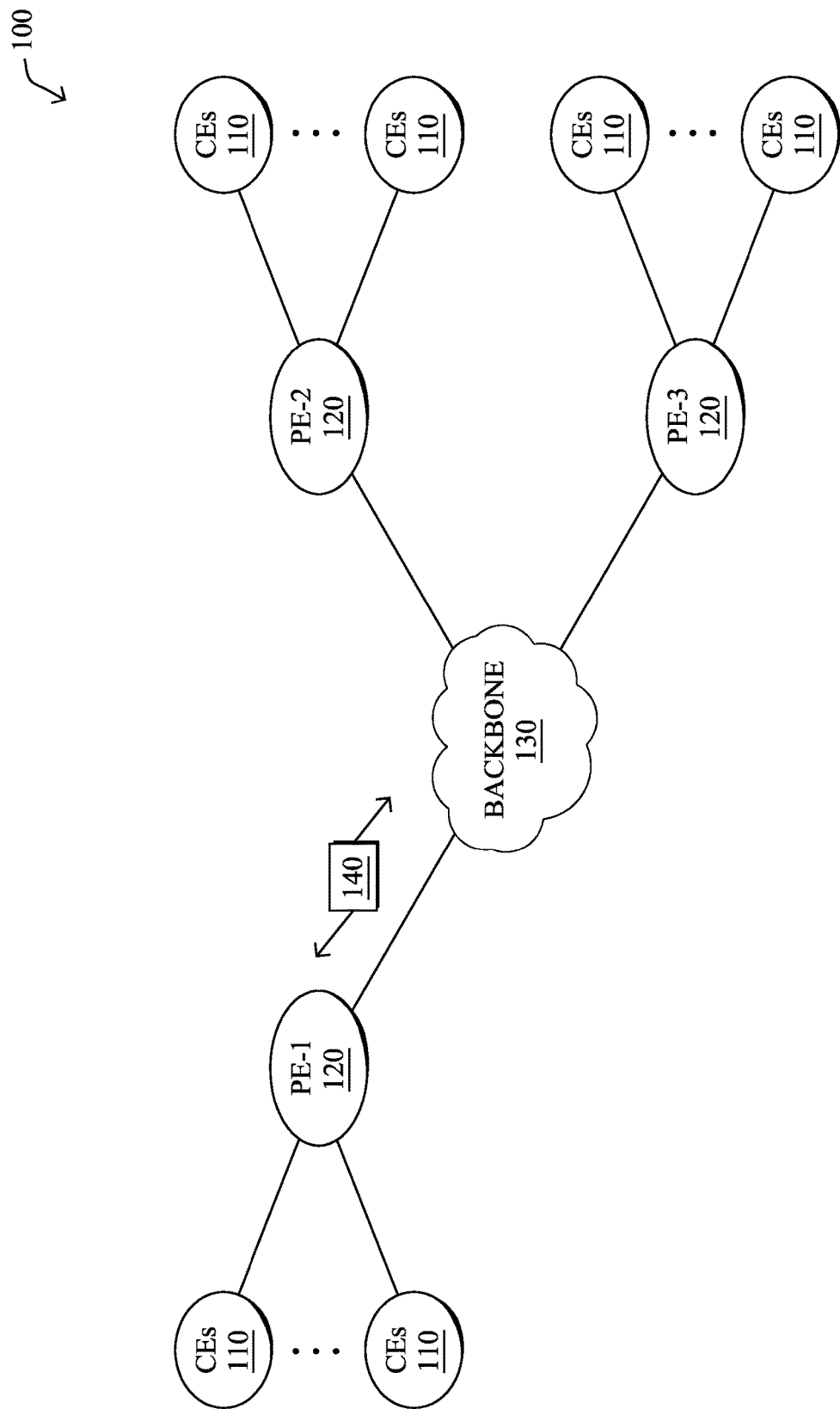
FIGS. 1A-1B illustrate an example communication network.

According to one or more embodiments of the disclosure, a service receives software version data regarding versions of software executed by devices in a network. The service detects a version change in the version of software executed by one or more of the devices, based on the received software version data. The service makes a determination that a drop in data quality of input data for a machine learning model used to monitor the network is associated with the detected version change. The service reverts the one or more devices to a prior version of software, based on the determination that the drop in quality of the input data for the machine learning model used to monitor the network is associated with the detected version change.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
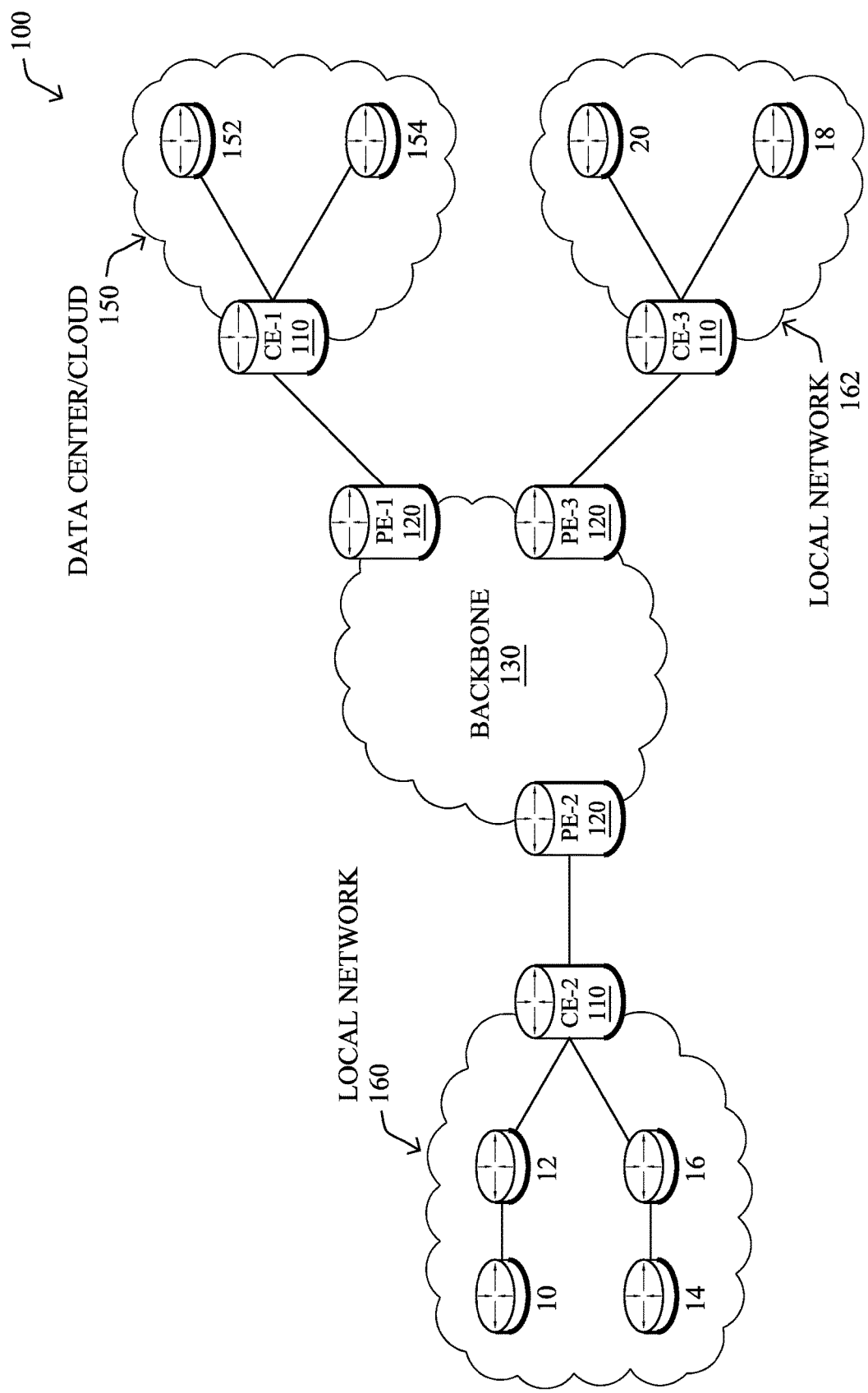

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
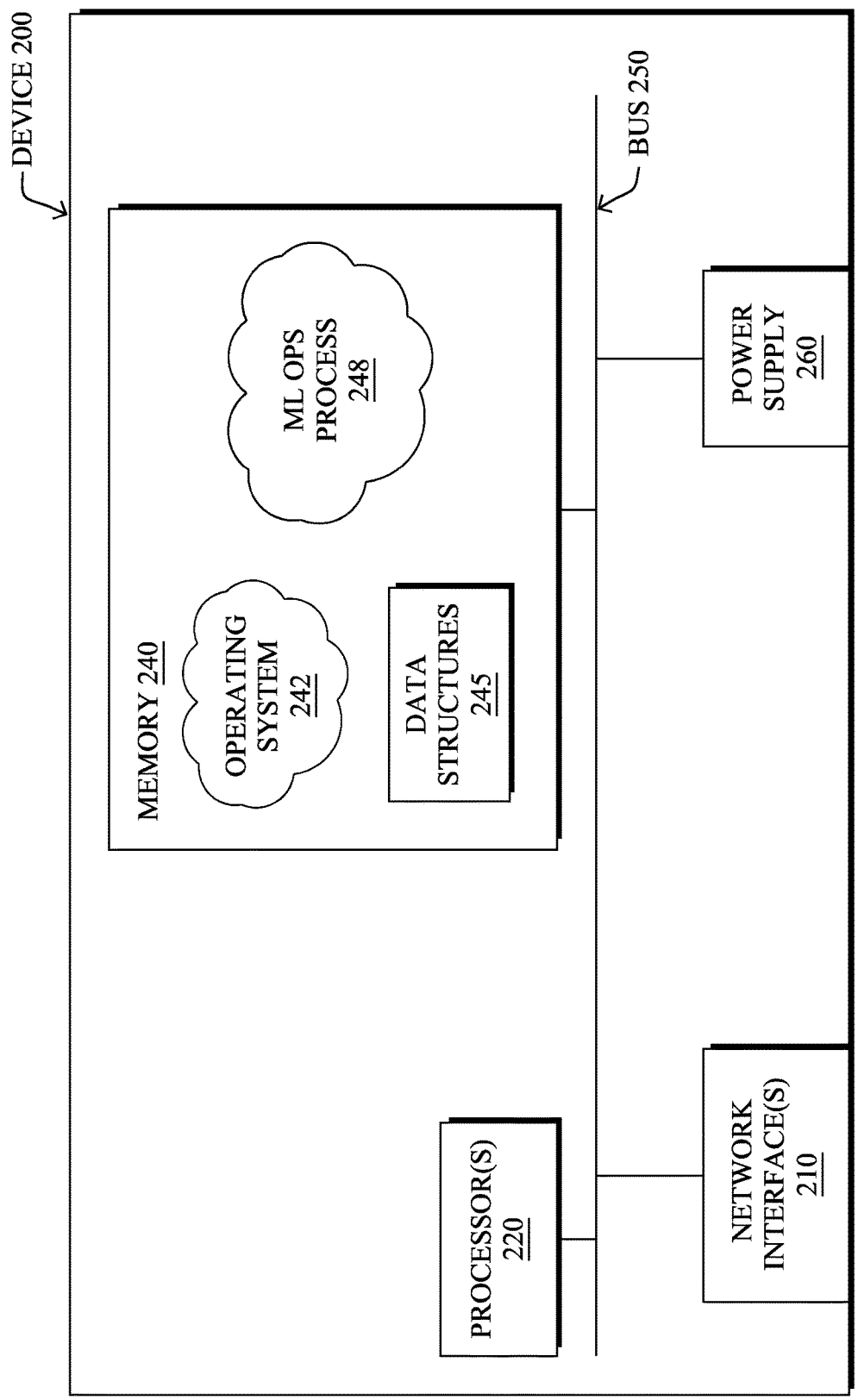
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a machine learning operations (ML Ops) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

ML Ops process 248 includes computer executable instructions that, when executed by processor(s) 220, cause device 200 to perform ML Ops functions as part of a network monitoring infrastructure for one or more networks. In general, ML Ops refers to the mechanisms by why machine learning models are created, deployed, and monitored over time. More specifically, in various embodiments, ML Ops process 248 may oversee the operations of one or more network monitoring services that utilize machine learning, such as a network assurance service, a device classification service, a network security service, or the like.

In some embodiments, ML Ops process 248 may itself utilize machine learning techniques, to monitor and adjust the operations of any number of ML-based network services. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, ML Ops process 248 may employ one or more supervised, unsupervised, or semi-supervised machine learning models. Generally, supervised learning entails the use of a training set of data, as noted above, that is used to train the model to apply labels to the input data. For example, the training data may include samples of 'good' operations and 'bad' operations and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that ML Ops Process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

The performance of a machine learning model can be evaluated in a number of ways based on the number of true positives, false positives, true negatives, and/or false negatives of the model. For example, consider the case of a machine learning model that predicts whether a network tunnel is likely to fail. In such ca case, the false positives of the model may refer to the number of times the model incorrectly predicted that the tunnel would fail. Conversely, the false negatives of the model may refer to the number of times the model incorrectly predicted that the tunnel would not fail. True negatives and positives may refer to the number of times the model correctly predicted whether the tunnel would operate as expected or is likely to fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
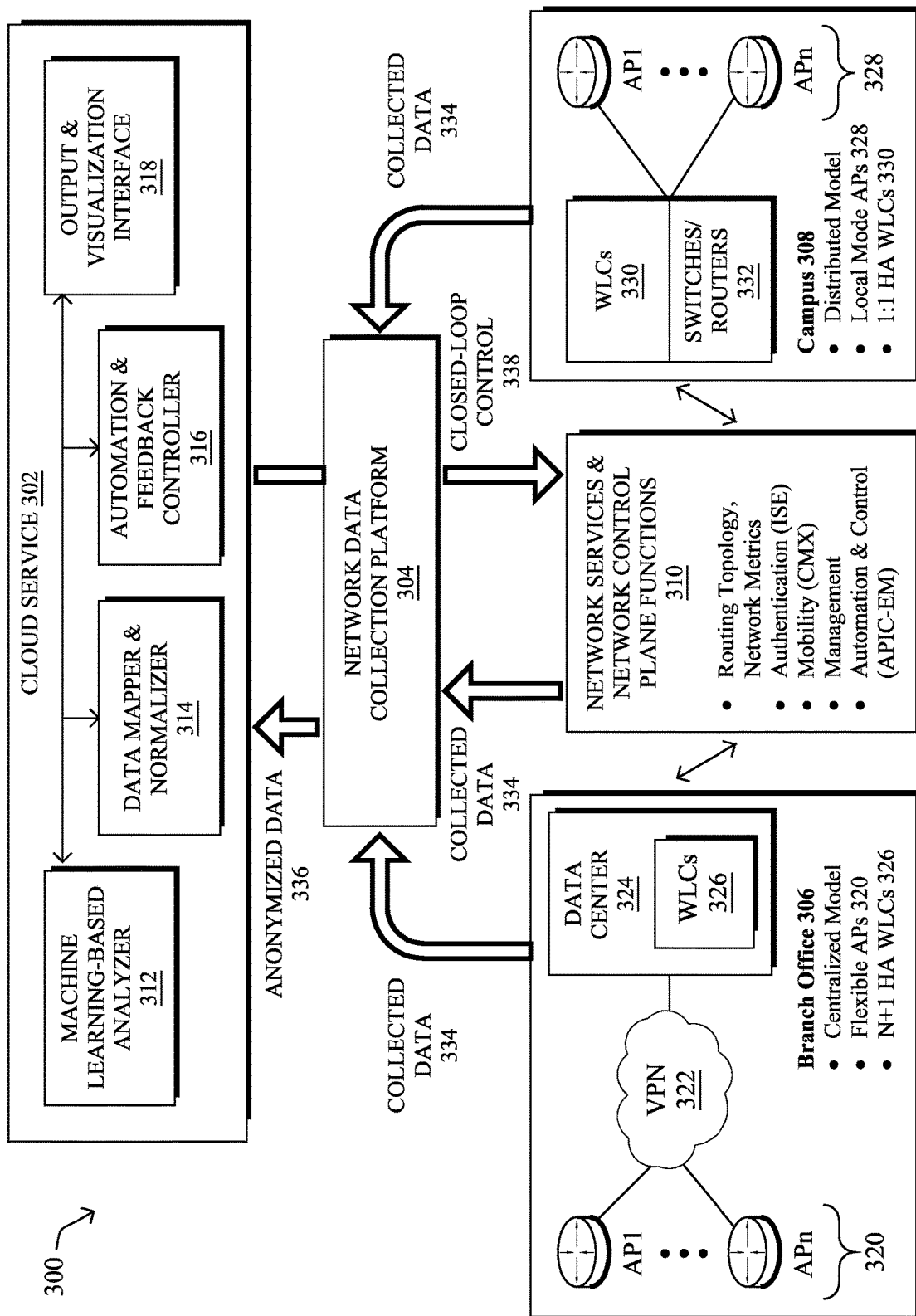
FIG. 3 illustrates an example network assurance system that uses machine learning to monitor a network.

FIG. 3 illustrates an example network assurance system 300 that uses machine learning to monitor a network, according to various embodiments. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

As shown, at the core of network assurance system 300 may be a cloud-based network assurance service 302 that leverages machine learning in support of cognitive analytics for the network, predictive analytics (e.g., models used to predict user experience, etc.), troubleshooting with root cause analysis, and/or trending analysis for capacity planning. Generally, network assurance system 300 may support monitoring for both wireless and wired networks, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, in machine learning-based network monitoring systems, such as network assurance system 300, data captured by networking elements (e.g., switches, wireless access point controllers, access points, etc.) is used as input data for downstream ML models. However, it has been observed that this data often changes as a result of the software of the reporting element being upgraded. For example, a software version change may result in the signal strength metrics captured by a particular networking element/device becoming corrupt or being computed using a different measurement technique, thereby changing the collected data. This can negatively impact the performance of the model(s) used to monitor the network, as they were trained on data collected via the previous software version.

With the recent trend of shorter and shorter software release cycles, this means that a machine learning model trained to monitor a given network may become obsolete in a relatively short amount of time. Further, the data analyzed by the model may originate from a large number of networking elements/devices, with a good chance that at least some of them are running different software versions than others.

——Predicting the Impact of Network Software Upgrades on Machine Learning Model Performance——

The techniques herein introduce an automated ML Ops system that is able to detect the early impact of software version changes on the data quality of input data for a machine learning model, as well as on the performance of the model, itself. In some aspects, the techniques herein extract change patterns from the input data, after a software version change is detect, to assess the impact of the version change on the model. In further aspects, the techniques herein also introduce an approach to predicting the impact of proposed software upgrades on machine learning model performance, allowing a network administrator to evaluate the potential effects on the model before implementing the change.

Specifically, according to one or more embodiments of the disclosure as described in detail below, a service receives software version data regarding versions of software executed by devices in a network. The service detects a version change in the version of software executed by one or more of the devices, based on the received software version data. The service makes a determination that a drop in data quality of input data for a machine learning model used to monitor the network is associated with the detected version change. The service reverts the one or more devices to a prior version of software, based on the determination that the drop in quality of the input data for the machine learning model used to monitor the network is associated with the detected version change.

Illustratively, the techniques described herein may be performed by hardware, software, and/or firmware, such as in accordance with the ML Ops process 248, or another process, which may include computer executable instructions executed by the processor 220 (or independent processor of interfaces 210) to perform functions relating to the techniques described herein.

Figure 4:
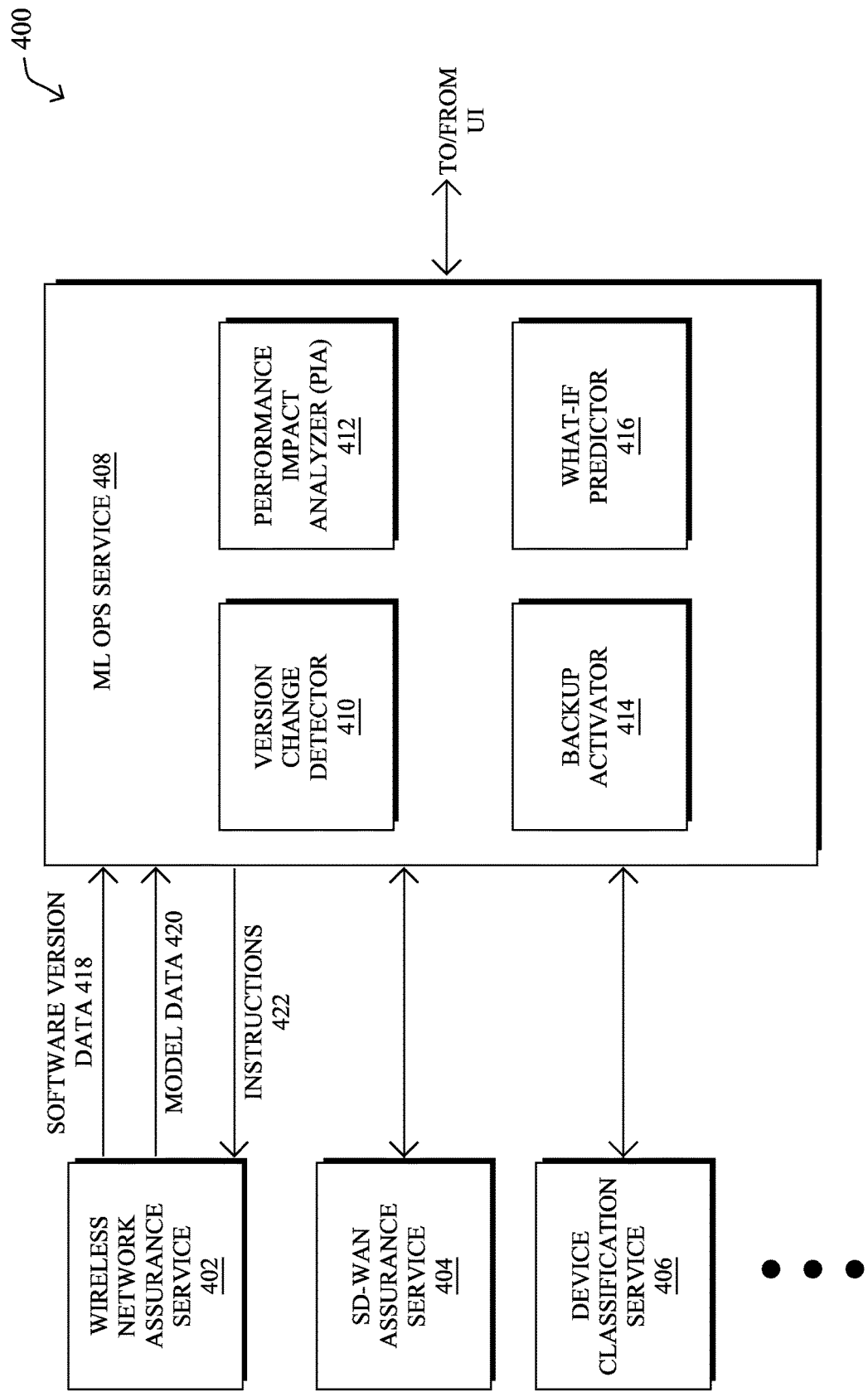
FIG. 4 illustrates an example machine learning operations (ML Ops) architecture.

Operationally, FIG. 4 illustrates an example architecture 400 for assessing data fidelity in a machine learning system/service, according to various embodiments. At the core of architecture 400 is a machine learning (ML) operations (Ops) service 408 that oversees the operations of any number of machine learning-based services/systems that each monitor one or more computer networks. For example, as shown, ML Ops service 408 may oversee the operation of a wireless network assurance service 402 that uses machine learning to monitor a wireless network, a software-defined wide area network (SD-WAN) assurance service 404 that uses machine learning to monitor an SD-WAN (e.g., to predict tunnel failures, etc.), a device classification service 406 that uses machine learning to classify devices in a network by device type, based on their behaviors, or the like.

As shown, ML Ops service 408 may comprise any or all of the following components: a version change detector 410, a performance impact analyzer (PIA) 412, a backup activator 414, and/or a what-if predictor 416. In some embodiments, some or all of the components 410-416 of architecture 400 may be implemented as part of the machine learning-based service (e.g., services 402-406, etc.) itself or, alternatively, as part of a stand-alone service 408 that is in communication therewith. For example, services 402-406 may leverage application programming interfaces (APIs) of ML Ops service 408, thereby allowing service 408 to oversee the operations of the machine learning components of services 402-406.

In various embodiments, version change detector 410 may be responsible for detecting which networking elements/devices have undergone a software version change and, if so, the time associated with the change. Typically, the software monitored by version change detector 410 is the operating system version of the device. However, in the more general sense, version change detector 410 may track and detect software version changes for any form of software whose version could affect the input data for a machine learning model of any of services 402-406.

For example, as shown, version change detector 410 may receive software version data 418 from wireless network assurance service 402 regarding the software versions used by the various networking devices/entities that service 402 monitors (e.g., WLCs, routers, APs, etc.). Data 418 may be gathered and reported by service 402 periodically or on demand and may be reported to ML Ops service 408 on a push or pull basis. In turn, version change detector 410 may analyze the software version data 418 and raise an event upon detecting a software version change in the version of software executed by any of the corresponding devices in the network.

Figure 5A:
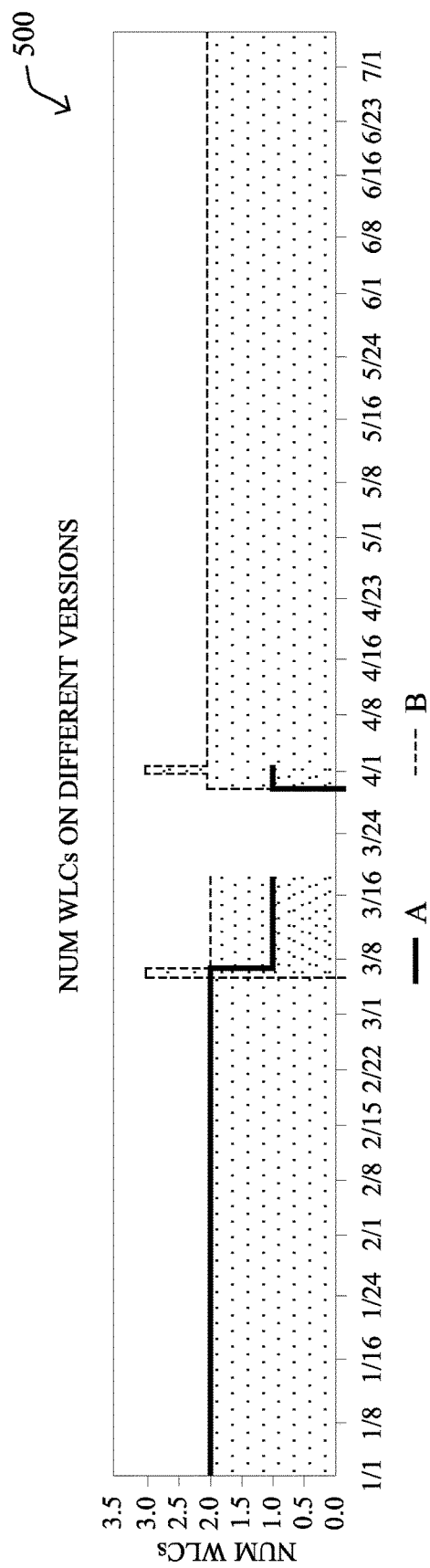
FIGS. 5A-5C illustrate example plots of the effects of software version changes on data quality.

FIG. 5A illustrates an example plot 500 showing the software versions of WLCs in a network having two WLCs. As shown, at the beginning of the year, both WLCs in the network ran version Auntil Mar. 6, 2019. On this date, a software version change was implemented, to upgrade the software of one of the WLCs to version B of the software. The other WLC was subsequently upgraded to software version B on Mar. 29, 2019. Version change detector 410 may monitor this information and, on detection of a software version change, log the device identifier (e.g., wlc-id), timestamp, and version as part of the software version change event.

Referring again to FIG. 4, version change detector 410 may also collect additional data regarding a software version change event such as whether the new version is considered to be a stable release, whether the change was prompted by pre-release testing, or the like. Such information can be included in software version data 418 or specified separately via a user interface.

According to various embodiments, performance impact analyzer (PIA) 412 is configured to analyze the effects of a software version change detected by version change detector 410 on a machine learning model. More specifically, PIA 412 may detect when a software version change is associated with a drop in model performance, as indicated by model data 420, and may also determine the root cause of the decrease, such as a loss of data quality of the input data for the model attributable to the software version change.

Figure 5B:
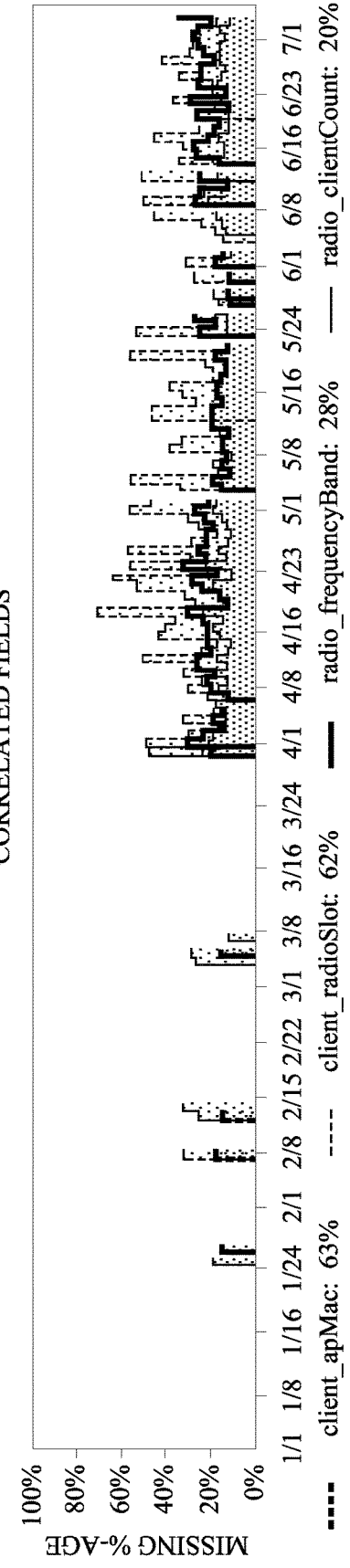
Figure 5C:
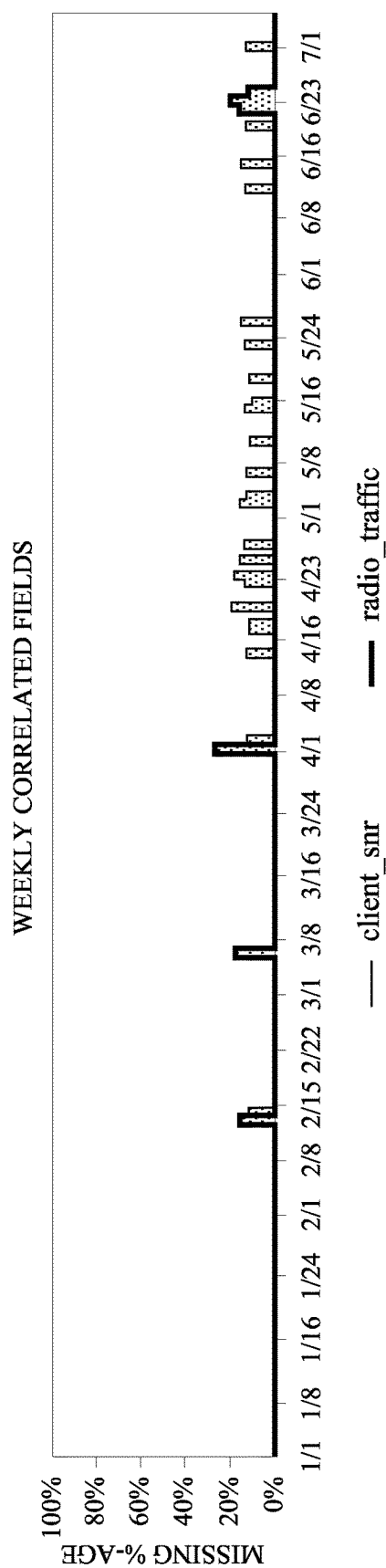

FIG. 5B illustrates a plot 510 of the missing percentage of data values of various telemetry data variables collected by the WLCs associated with plot 500 in FIG. 5. These telemetry data variables include the following:
  client_apMac—e.g., the MAC address/identifier of the AP
  client_radioSlot—e.g., the radio slot used
  radio_clientCount—e.g., the wireless client counts
  radio_frequencyBand—e.g., frequency band information In other words, the missing percentage or amount of telemetry data values that are used to drive the input to the machine learning model(s) also serve as data quality measurements for the input data. Notably, a machine learning model used to monitor the network relies heavily on such information and, consequently, its output becomes unreliable when there is a relatively high degree of missing values. In extreme cases, the model may not even be able to function when certain field values are missing, preventing its inference from proceeding.

In comparing plots 500 and 510 in FIGS. 5A-5B, several observations can be made. First, the telemetry data fields appear to have almost no missing values, prior to Apr. 1, 2019. Second, this date is very close to when both WLCs were finally upgraded to software version B, indicating that there is a strong correlation between the software version change and the drop in data quality of the collected telemetry. Indeed, after the version change, the missing percentage increases from almost 0% to up to 70% at times.

Note that the effects of a software version change on the data quality of input data for the machine learning model may only affect only a subset of the telemetry data fields consumed by the model. For example, as shown in plot 520 in FIG. 5C, assume that there are two additional telemetry data fields also collected over the same timeline as that of plots 500-510:

client_snr—e.g., the signal-to-noise ratio (SNR) observed
radio_traffic—e.g., the volume of radio_traffic From plot 520, it can also be seen that these two telemetry data fields above are only weakly correlated with the software version changes shown in FIG. 5A. Accordingly, the effects of a software version change on the data quality may be assessed on a per-telemetry field basis, so as to determine the root cause of any drop in model performance.

Figure 6:
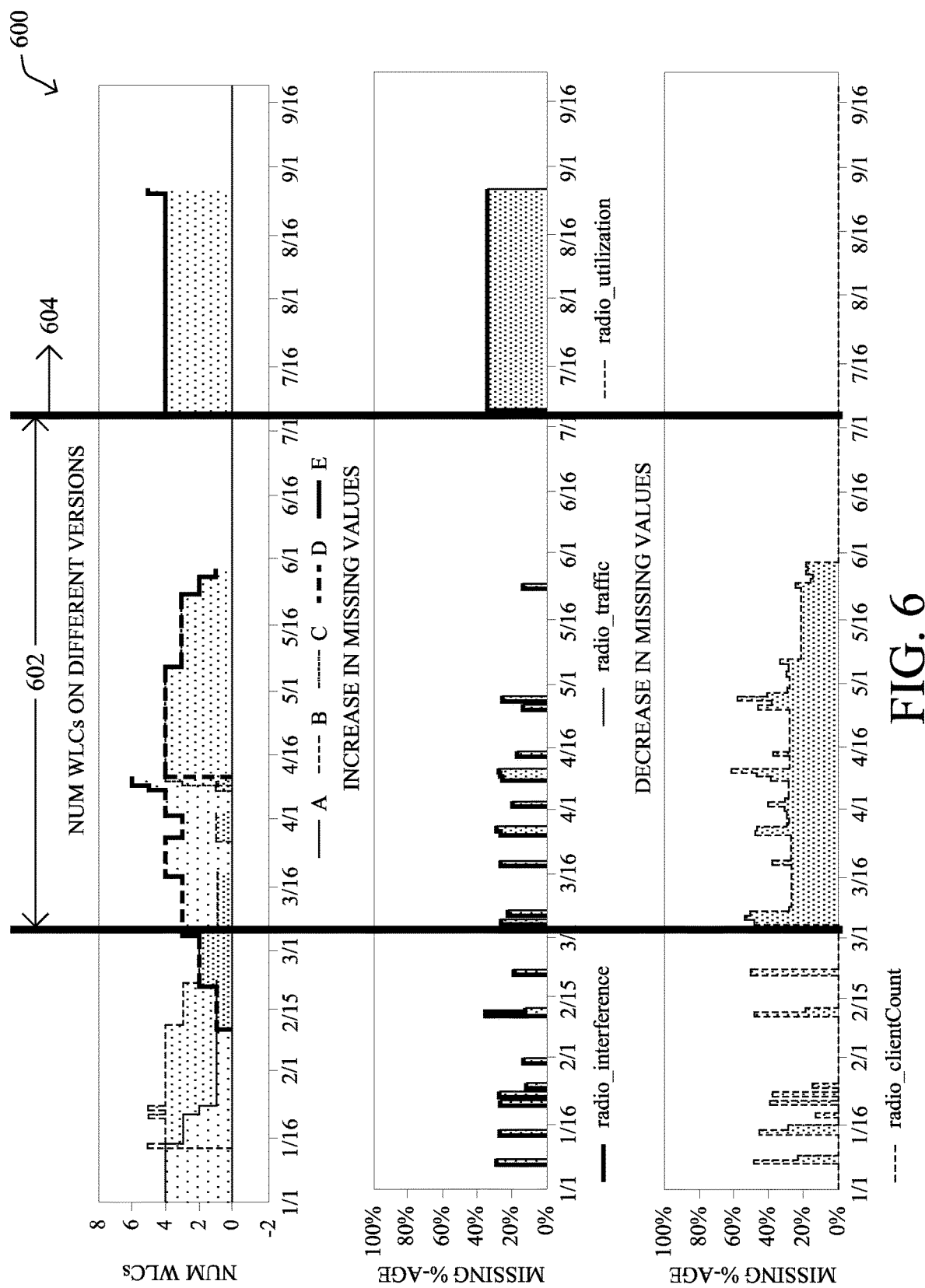
FIG. 6 illustrates an example plot showing the dynamics of software version changes.

FIG. 6 illustrates another plot 600 for another network contrasting the number of WLCs running the various software with the percentage of missing values for the following telemetry data fields:
  radio_interference—e.g., the amount of interference observed
  radio_traffic
  radio_utilization—e.g., the degree of radio utilization
  radio_clientCount From plot 600, it can be seen from timespan 602 that software versions C and D exhibit high missing radio_clientCount values. Then, from time period 604 onward, this issue was fixed in software version 8.9.100.0, when the WLCs were upgraded to this version. While software version 8.9.100.0 fixed the issue with missing radio_clientCount values, it can also be seen in plot 600 that this version introduced a new data quality issue whereby the approximately 34% of the radio_interference, radio_traffic, and radio_utilization values are now missing. Such insights provide valuable feedback about the impact of software version changes and can be used to detect and act on severe changes such that the machine learning model(s) that rely on this data do not provide low quality outputs.

Figure 7A:
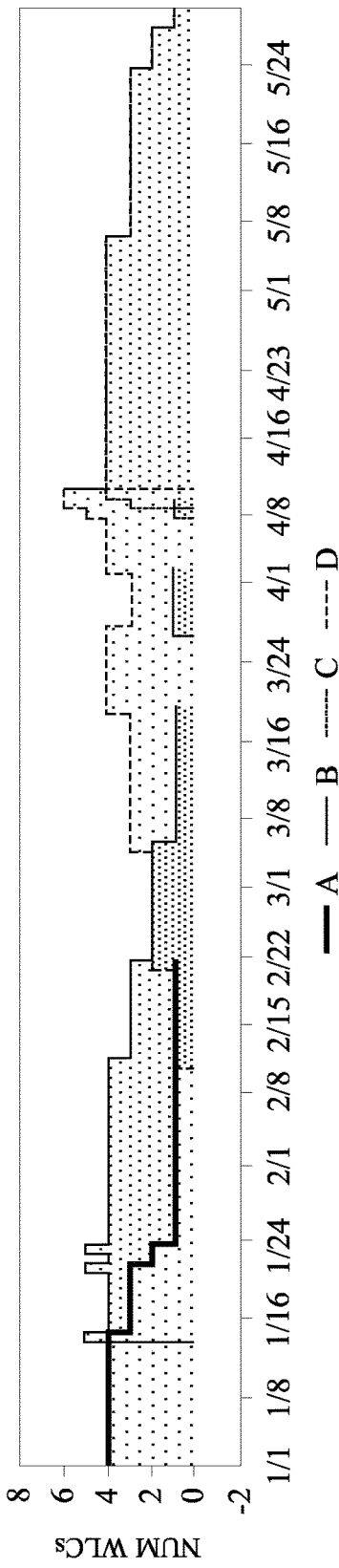
FIGS. 7A-7B illustrate example plots showing data quality issues associated with software version changes.
Figure 7B:
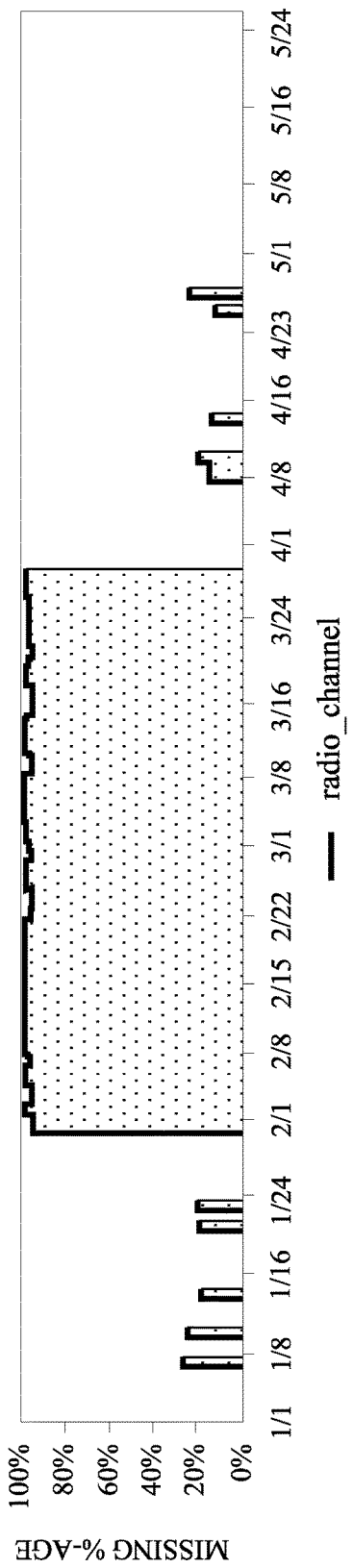

FIGS. 7A-7B illustrate yet further example plots 700-710 contrasting the software version changes for six WLCs and the missing percentage of radio_channel data values. In this case, as shown in plot 710 a clear drop in data quality for the radio_channel metric can be seen, whereby nearly 100% of its values are missing for almost two months, starting in late January. However, while the software versions of the WLCs were changed during this time period, this drop in data quality is not correlated with an particular software version change. Detection of changes in the data quality that are not correlated with a software version change by PIA 412 is also advantageous, as it may indicate other issues in the network that are not readily apparent.

Referring again to FIG. 4, as noted, a key function of PIA 412 is to identify correlations between software version changes detected by version change detector 410 and changes in the data quality of the input data used by the model(s) of services 402-406, etc. To do so, PIA 412 may leverage a statistical or machine learning-based approach, in various embodiments.

In one embodiment, PIA 412 may maintain and assess a mapping of detected software version changes and changes in the data quality of the model input data (e.g., as indicated by model data 420). For example, assume that version change detector 410 detects a version change event indicating a change from version A to version B in the network monitored by wireless network assurance service 402. On detecting the change, version change detector 410 records the customer or network name, the identifier(s) of the networking device(s), and timestamp information for the version change. In response, PIA 412 may initiate a 'change comparator' job to run after a threshold time period after the change to the new software version was first observed (e.g., for two days, afterwards). In some embodiments, PIA 412 may instead leverage data obtained from another network and skip this waiting period, if the version change to version B was observed previously in the network.

Assuming that the detected version change was to a new version of software previously unseen by PIA 412, PIA 412 may run a change comparator job over a predefined period of time to extract two datasets: 1.) version-A-dataset which consists of the data-quality metrics for different fields (e.g., missing percentage) when the network element(s)/device(s) were running version A and 2.) version-B-dataset with the same metrics from when the network element(s)/device(s) were running software version B. In turn, PIA 412 may compare these two datasets, to detect any significant changes.

The change comparison by PIA 412 can be implemented in a number of different ways. In one embodiment, PIA 412 may compare the pre-version-change and post-version-change distributions of the metric/data values, using a two-sample test. For example, if the telemetry metric is continuous, PIA 412 may employ a technique such as the Koimogorov-Smirnov (KS) test, the Earth Movers Distance (Wasserstein distance), or Cramer-Von Mises Distance, to detect any changes in the data quality. Conversely, if the metric is categorical in nature, PIA 412 can employ a technique such as the chi-squared test. The result of the analysis by PIA 412 may take the form of either or both of the following quantities:
  Distance: This quantifies how different the pre- and post-change data distributions are. Note that each comparison approach looks for a specific type of difference between the two distributions and the most appropriate technique can be chosen based on the need. For example, a KS-distance measures the maximum distance between the empirical cumulative distribution functions (CDFs). Hence, it is a good candidate to measure change when any big change at any point of the metric needs to be highlighted. However, if the data is noisy, this might lead to large changes at the tails of the distribution. Hence, the KS-distance might not be an ideal candidate for noisy metrics and other comparison techniques can be used.
  P-value: In this context, the probability (p-) value is the statistical measure used to indicate the confidence of the test that the two distributions are the same. A very low p-value, usually <0.05, indicates that the distributions are perhaps different.

Based on the p-value and/or the distance, PIA 412 may quantify and infer whether the one metric has, in fact, changed across versions (and by how much).

In another embodiment, PIA 412 may a change point detection mechanism, such as a Bayesian or cumulative sum control chart (CUMSUM)-based approach. In this case, PIA 412 will assess the time of version change and then mix the datasets for version-A and version-B, for each network element/device, to detect any change points. In some cases, PIA 412 may be configured to detect only 'strong' changes (e.g., based on one or more predefined thresholds, such as the number of elements/devices that exhibit this correlation). If there is at least one of the change points that is close in time to the time of the software version change, PIA 412 may determine that the change in data quality of the telemetry data field is indeed associated with the software version change.

Note that any of the above approaches provides a list of strongly correlated fields and the extent of change. In turn, PIA 412 may perform any or all of the following:
  If the expected change is very highly correlated (with very high confidence), then PIA 412 sends a message to backup activator 414 to request that the device(s)/element(s) be reverted to the previous software version.

Send notification to what-if predictor 416 including the data about <customer-list, field, extent-of-change>. As detailed below, what-if predictor 416 may use this information to assess the impact of a software version change on other networks and initiate any corrective measures.

Send an alert to a user interface (UI) about the potential changes in data quality, allowing a developer, tester, or other interested party to assess the change. In some embodiments, PIA 414 may open a ticket with a software management system, so that corrections can be included in a subsequent software version. Doing so can also help to 'freeze' the suspect version, to prevent its deployment to other devices.

When backup activator 414 receives an indication of a detected association between a software version change and a decrease in the quality of the input data for a machine learning model of any of services 402-406, backup activator 414 may initiate a number of immediate actions, until a more permanent solution is implemented. For example, if PIA 412 determines that there is a strong correlation between a software version change and an increase in the percentage or amount of missing data values for a particular telemetry data field, backup activator 414 may send an instruction 422 back to the entities/device(s) who underwent the version change. Such an instruction may, for instance, cause the device(s) to revert to using a previous version of the software so that the downstream machine learning is not impacted.

In some cases, backup activator 414 may first send a notification to the user interface (UI) of ML Ops service 408, to first seek confirmation from the user, before implementing any software rollbacks. For example, backup activator 414 may seek a scheduled time to revert the software of the device(s), so as to minimize any impact on the network during the reversion.

In further cases, backup activator 414 may revert the device(s) to a prior version of software according to a defined policy. For example, such a policy may indicate on a per-device basis whether backup activator 414 should automatically revert the software of the device in the event of a loss of data quality. Such a policy may also specify a threshold degree of correlation, a threshold change in data quality, etc., to control the decisions of backup activator 414. Indeed, it may sometimes be preferably for ML Ops service 408 to simply send an alert about a drop in data quality, as opposed to initiating a software rollback, automatically.

In various embodiments, architecture 400 may also include what-if predictor 416 which is responsible for predicting the impact, if any, of a proposed software version change. As would be appreciated, most software today is deployed in a network without the ability to evaluate any potential issues that may arise. In some embodiments, PIA 412 may inform what-if predictor 416 of a detected change in data quality that is associated with a software version change (e.g., after observing the data for a period of time after the change). In turn, what-if predictor 416 can use this information to make predictions about proposed software version changes for other devices or networks. This allows what-if predictor 416 to alert the users responsible for those devices or networks as to the potential impacts of the changes.

The exact approach taken by what-if predictor 416 to predict the effects of a proposed software version change may vary, depending on the type of metric involved (e.g., missing percentage or missing data). In one embodiment, what-if predictor 416 may assess the training, validation, and test parameters used to train the corresponding machine learning model. In turn, what-if predictor 416 may simulate the effects of the software version change on this dataset, so as to generate a 'simulated dataset.' For example, if the radio_clientCount is observed to have changed by 34% as a result of the version change, what-if predictor 416 may randomly replace the field values of radio_clientCount in 34% of the data. What-if predictor 416 can leverage other approaches to replace such values, in further embodiments. The timeline of missing values can be appropriately aligned to the simulated dataset by what-if predictor 416 replacing the data from each data with the respective missing values observed by PIA 412. In a more advanced approach, what-if predictor 416 may replace values in the training dataset for the model only for certain elements/devices. Based on the results of the simulated dataset on the model under scrutiny, what-if predictor 416 may raise an alert to prevent the proposed upgrade, if predictor 416 predicts that doing so will negatively affect the performance of the model.

Figure 8:
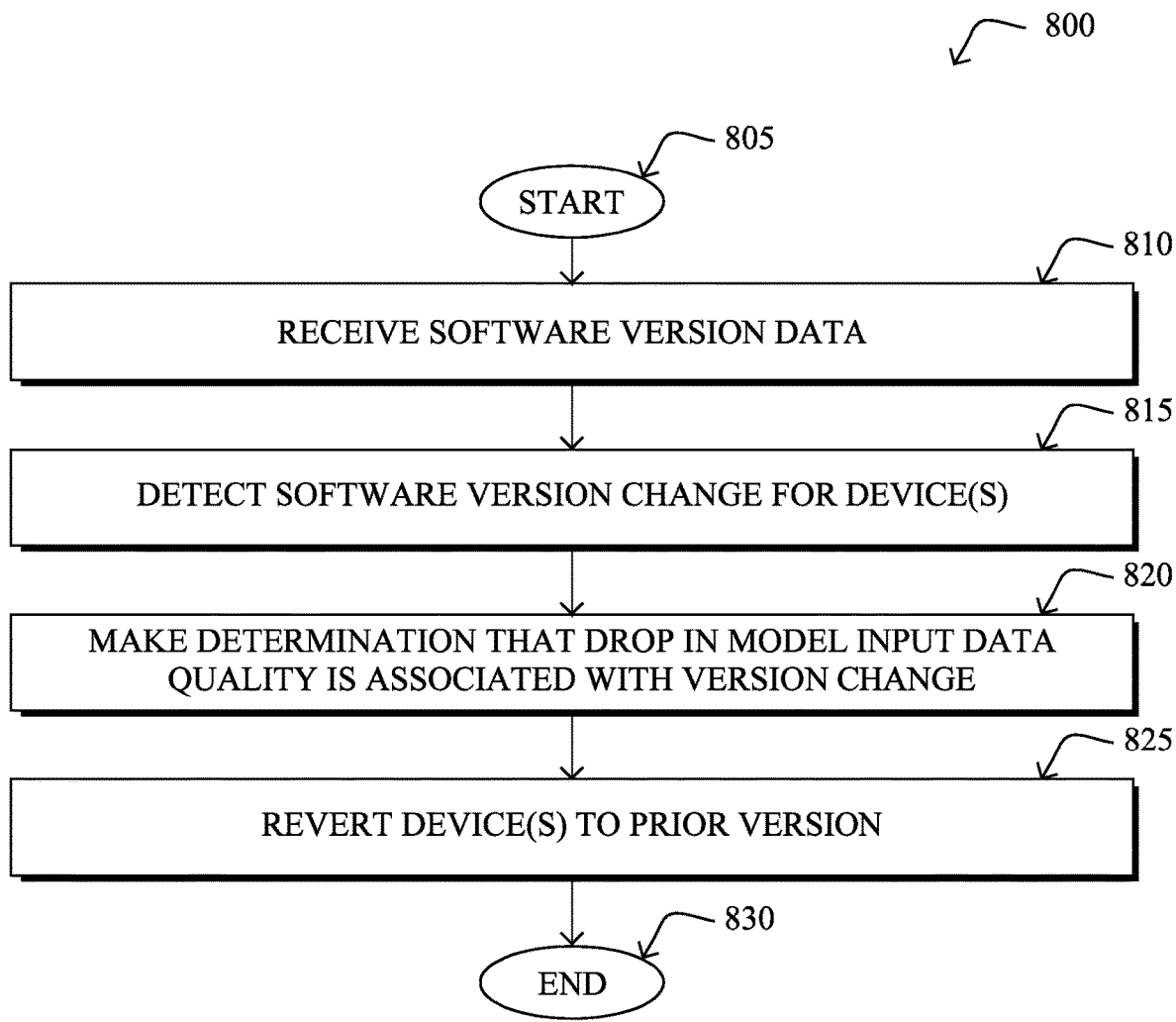
FIG. 8 illustrates an example simplified procedure for predicting the impact of software upgrades on data quality.

FIG. 8 illustrates an example simplified procedure for predicting the impact of network software upgrades on machine learning model performance, in accordance with one or more embodiments described herein. For example, a non-generic, specifically configured device may perform procedure 800 by executing stored instructions, to provide a service to one or more networks (e.g., an ML Ops service). The procedure 800 may start at step 805, and continues to step 810, where, as described in greater detail above, the service may receive software version data regarding versions of software executed by devices in a network.

At step 815, as detailed above, the service may detect a version change in the version of software executed by one or more of the devices, based on the received software version data. For example, the service may catalog the software versions executed by each of the devices and compare any newly received software version data to that previously recorded, to identify any software version changes that may have taken place.

At step 820, the service may make a determination that a drop in data quality of input data for a machine learning model used to monitor the network is associated with the detected version change, as described in greater detail above. Such a drop in data quality may correspond, for example, to an increase of missing values for a particular telemetry data field that the one or more devices previously collected. In one embodiment, the service may make the determination by comparing a distribution of the input data from prior to the version change to a distribution of the input data from after the version change. In further embodiments, the service may use change point detection, to make the determination.

At step 825, as detailed above, the service may revert the one or more devices to a prior version of software, based on the determination that the drop in quality of the input data for the machine learning model used to monitor the network is associated with the detected version change. In some embodiments, the service may do so automatically, such as by sending an instruction to the device(s), either directly or indirectly. In further embodiments, the service may only do so after receiving an instruction from a user interface to revert the one or more devices to the prior version of the software. Procedure 800 then ends at step 830.

It should be noted that while certain steps within procedure 800 may be optional as described above, the steps shown in FIG. 8 are merely examples for illustration, and certain other steps may be included or excluded as desired.

Further, while a particular order of the steps is shown, this ordering is merely illustrative, and any suitable arrangement of the steps may be utilized without departing from the scope of the embodiments herein.

The techniques described herein, therefore, allow for the correlation of software version changes to data quality changes in the input data used by one or more machine learning models. In another aspect, the techniques herein also allow for the prediction of the impact, if any, of a planned software version change. In yet another aspect, the techniques herein also provide closed loop control over the network, allowing for proactive measures to be taken, when a version change affects the model(s) in an adverse way.

While there have been shown and described illustrative embodiments that provide for assessing and predicting the effects of software version changes on data quality for a machine learning model, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a service, software version data regarding versions of software executed by devices in a network that provide input data for a machine learning model used to monitor another network that is different from the network;
   detecting, by the service, a version change in the version of software executed by one or more of the devices, based on the received software version data;
   identifying, by the service, a drop in data quality of the input data as a root cause of a drop in performance of the machine learning model;
   predicting, by the service, an impact of the detected version change on the input data by using a simulated dataset as input to the machine learning model, wherein the simulated dataset is formed by simulating an impact of the detected version change on a training dataset for the machine learning model;
   making, by the service and based in part on the predicted impact of the detected version change on the input data, a determination that the drop in data quality of the input data is associated with the detected version change; and
   reverting, by the service, the software of the one or more devices to a prior version of software, based on the determination that the drop in quality of the input data is associated with the detected version change.

2. The method as in claim 1, wherein the one or more devices comprise at least one of: a router, a switch, a wireless access point, or an access point controller.

3. The method as in claim 1, wherein the drop in data quality corresponds to an increase of missing values for a particular telemetry data field that the one or more devices previously collected.

4. The method as in claim 1, wherein making the determination that the drop in data quality of the input data is associated with the detected version change comprises:
   comparing a distribution of the input data from prior to the version change to a distribution of the input data from after the version change.

5. The method as in claim 1, further comprising:
   providing an indication of the determination to a user interface; and
   receiving, via the user interface, an instruction to revert the one or more devices to the prior version of the software, wherein the service reverts the one or more devices to the prior version of the software, in response to the instruction.

6. The method as in claim 1, wherein the service uses change point detection to make the determination.

7. An apparatus, comprising:
   one or more network interfaces;
   a processor coupled to the network interfaces and configured to execute one or more processes; and
   a memory configured to store a process executable by the processor, the process when executed configured to:
      receive software version data regarding versions of software executed by devices in a network that provide input data for a machine learning model used to monitor another network that is different from the network;
      detect a version change in the version of software executed by one or more of the devices, based on the received software version data;
      identify a drop in data quality of the input data as a root cause of a drop in performance of the machine learning model;
      predict an impact of the detected version change on the input data by using a simulated dataset as input to the machine learning model, wherein the simulated dataset is formed by simulating an impact of the detected version change on a training dataset for the machine learning model;
      make, based in part on the predicted impact of the detected version change on the input data, a determination that the drop in data quality of the input data is associated with the detected version change; and
      revert the software of the one or more devices to a prior version of software, based on the determination that the drop in quality of the input data is associated with the detected version change.

8. The apparatus as in claim 7, wherein the one or more devices comprise at least one of: a router, a switch, a wireless access point, or an access point controller.

9. The apparatus as in claim 7, wherein the drop in data quality corresponds to an increase of missing values for a particular telemetry data field that the one or more devices previously collected.

10. The apparatus as in claim 7, wherein the apparatus makes the determination that the drop in data quality of the input data is associated with the detected version change by:

comparing a distribution of the input data from prior to the version change to a distribution of the input data from after the version change.

11. The apparatus as in claim 7, wherein the process when executed is further configured to:
   provide an indication of the determination to a user interface; and
   receive, via the user interface, an instruction to revert the one or more devices to the prior version of the software, wherein the apparatus reverts the one or more devices to the prior version of the software, in response to the instruction.

12. The apparatus as in claim 7, wherein the apparatus uses change point detection to make the determination.

13. A tangible, non-transitory, computer-readable medium storing program instructions that cause a service to execute a process comprising:
   receiving, at the service, software version data regarding versions of software executed by devices in a network that provide input data for a machine learning model used to monitor another network that is different from the network;
   detecting, by the service, a version change in the version of software executed by one or more of the devices, based on the received software version data;
   identifying, by the service, a drop in data quality of the input data as a root cause of a drop in performance of the machine learning model;
   predicting, by the service, an impact of the detected version change on the input data by using a simulated dataset as input to the machine learning model, wherein the simulated dataset is formed by simulating an impact of the detected version change on a training dataset for the machine learning model;
   making, by the service and based in part on the predicted impact of the detected version change on the input data, a determination that a drop in data quality of the input data is associated with the detected version change; and
   reverting, by the service, the software of the one or more devices to a prior version of software, based on the determination that the drop in quality of the input data is associated with the detected version change.

14. The computer-readable medium as in claim 13, wherein the one or more devices comprise at least one of: a router, a switch, a wireless access point, or an access point controller.

15. The computer-readable medium as in claim 13, wherein the drop in data quality corresponds to an increase of missing values for a particular telemetry data field that the one or more devices previously collected.

* * * * *

UNITED STATES PATENT AND TRADEMARK OFFICE
CERTIFICATE OF CORRECTION

| | | |
|---|---|---|
| PATENT NO. | : 11,409,516 B2 | |
| APPLICATION NO. | : 16/709307 | |
| DATED | : August 9, 2022 | |
| INVENTOR(S) | : Vinay Kumar Kolar | |

It is certified that error appears in the above-identified patent and that said Letters Patent is hereby corrected as shown below:

In the Specification

Column 13, Line 2, please amend as shown:
radio_traffic – e.g., the volume of radio traffic Column 14, Line 20, please amend as shown:
Kolmogorov-Smirnov (KS) test, the Earth Movers Distance Signed and Sealed this
Fifteenth Day of November, 2022

Katherine Kelly Vidal
*Director of the United States Patent and Trademark Office*